Figure 1:
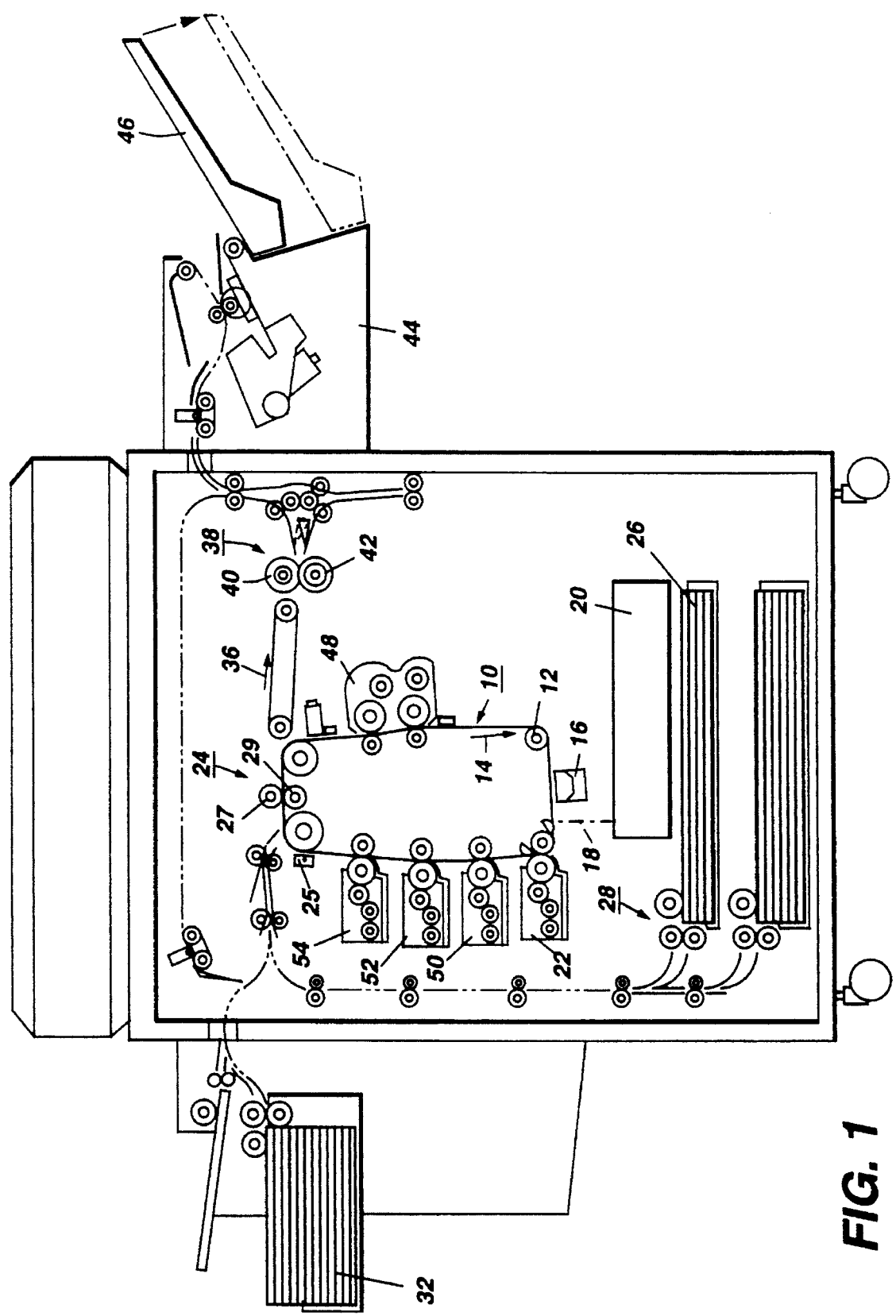

United States Patent [19]
Brewington et al.

[11] Patent Number: 5,583,629
[45] Date of Patent: Dec. 10, 1996

[54] COLOR ELECTROPHOTOGRAPHIC PRINTING MACHINE

[75] Inventors: Grace T. Brewington, Fairport; Richard P. Germain, Webster; Paul C. Julien, Webster; Ronald J. Koch, Webster, all of N.Y.

[73] Assignee: Xerox Corporation, Stamford, Conn.

[21] Appl. No.: 496,483

[22] Filed: Jun. 29, 1995

[51] Int. Cl.$^6$ ............................................. G03G 15/01
[52] U.S. Cl. ...................... 355/326 R; 355/327; 347/115; 358/296
[58] Field of Search ............................ 355/326 R, 327, 355/328; 430/45, 111; 358/296, 298, 300; 347/115, 119, 232

[56] References Cited

U.S. PATENT DOCUMENTS

| | | | |
|---|---|---|---|
| 4,403,848 | 9/1983 | Snelling | 355/327 |
| 4,599,285 | 7/1986 | Haneda et al. | 430/54 |
| 4,679,929 | 7/1987 | Haneda et al. | 355/326 R X |
| 4,791,455 | 12/1988 | Yamamoto et al. | 355/303 |
| 4,809,038 | 2/1989 | Yamamoto et al. | 355/327 |
| 4,833,503 | 5/1989 | Snelling | 355/259 |
| 4,927,724 | 5/1990 | Yamamoto et al. | 430/45 |
| 4,941,003 | 7/1990 | Takeda et al. | 346/160 |
| 4,949,125 | 8/1990 | Yamamoto et al. | 355/219 |
| 5,023,632 | 6/1991 | Yamamoto et al. | 346/157 |
| 5,066,989 | 11/1991 | Yamamoto | 355/270 |
| 5,079,115 | 1/1992 | Takashima et al. | 430/45 |
| 5,134,495 | 7/1992 | Frazier et al. | 358/298 |
| 5,177,543 | 1/1993 | Rodenberg et al. | 355/271 |
| 5,181,072 | 1/1993 | Furuya et al. | 355/326 R X |
| 5,204,730 | 4/1993 | Richmond et al. | 355/326 R |
| 5,241,357 | 8/1993 | Iwata | 355/326 R |
| 5,306,589 | 4/1994 | Yamamoto et al. | 430/111 |
| 5,325,165 | 6/1994 | Ohgita et al. | 355/326 R X |
| 5,346,790 | 9/1994 | Sacripante et al. | 430/111 X |
| 5,403,693 | 4/1995 | Patel et al. | 430/111 X |
| 5,450,172 | 9/1995 | Suzuki et al. | 355/326 R |
| 5,456,990 | 10/1995 | Takagi et al. | 430/111 X |
| 5,460,914 | 10/1995 | Sasaki et al. | 430/111 X |
| 5,515,155 | 5/1996 | Folkins | 355/326 R |

*Primary Examiner*—Matthew S. Smith
*Attorney, Agent, or Firm*—H. Fleischer; J. E. Beck; R. Zibelli

[57] ABSTRACT

A color electrophotographic printing machine in which latent images having a resolution of at least 1.44 million pixels per square inch are recorded on a photoconductive member. Different color toner powder images are developed in superimposed registration with one another to form a composite multicolor image. The composite multicolor image is transferred from the photoconductive member to a receiving member. Toner particles which have a selected pigmentation and small volume average diameters are used to minimize curl of the receiving member.

17 Claims, 2 Drawing Sheets

COLOR ELECTROPHOTOGRAPHIC PRINTING MACHINE

This invention relates to a color electrophotographic printing machine, and more particularly concerns recording a latent image on a photoconductive member with a resolution of at least 1.44 million pixels per square inch for each of a plurality of different colors.

A typical electrophotographic printing machine employs a photoconductive member that is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas to record an electrostatic latent image on the photoconductive member corresponding to the informational areas contained within the original document. After the electrostatic latent image is recorded on the photoconductive member, the latent image is developed by bringing a developer material into contact therewith. Generally, the electrostatic latent image is developed with dry developer material comprising carrier granules having toner particles adhering triboelectrically thereto. However, a liquid developer material may be used as well. The toner particles are attracted to the latent image forming a visible powder image on the photoconductive surface. After the electrostatic latent image is developed with the toner particles, the toner powder image is transferred to a sheet. Thereafter, the toner image is heated to permanently fuse it to the sheet.

It is highly desirable to use an electrophotograhic printing machine of this type to produce color prints. In order to produce a color print, it is frequently necessary to form yellow, magenta and cyan color separations. One skilled in the art will appreciate that the black separation can be made either as the first or last with respect to the other color separation. In this way, a permanent color print is formed. It is highly advantageous to use a common architecture for both monocolor or multicolor printing. Heretofore, multicolor electrophotographic printing machines have not been capable of achieving true lithographic quality. For short color runs, electrophotographic color printing would be highly competitive with conventional printing processes. However, it has been found that the quality of the prints printed in this manner fail to achieve the required lithographic quality. In addition, it has been found that color prints, which require multilayers superimposed in registration on one another, frequently curl. Not only is it necessary to improve the quality of color electrophotographic prints, but it is also desirable to eliminate any curl therein. Various types of multicolor printing machines have heretofore been employed. The following disclosures appear to be relevant to certain aspects of the present invention:

U.S. Pat. No. 4,403,848 Patentee: Snelling Issued: Sep. 13, 1983

U.S. Pat. No. 4,599,285 Patentee: Haneda et al. Issued: Jul. 8, 1986

U.S. Pat. No. 4,679,929 Patentee: Haneda et al. Issued: Jul. 14, 1987

U.S. Pat. No. 4,791,455 Patentee: Yamamoto et al. Issued: Dec. 13, 1988

U.S. Pat. No. 4,809,038 Patentee: Yamamoto et al. Issued: Feb. 28, 1989

U.S. Pat. No. 4,833,503 Patentee: Snelling Issued: May 23, 1989

U.S. Pat. No. 4,927,724 Patentee: Yamamoto et al. Issued: May 22, 1990

U.S. Pat. No. 4,941,003 Patentee: Takeda et al. Issued: Jul. 10, 1990

U.S. Pat. No. 4,949,125 Patentee: Yamamoto et al. Issued: Aug. 14, 1990

U.S. Pat. No. 5,023,632 Patentee: Yamamoto et al. Issued: Jun. 11, 1991

U.S. Pat. No. 5,066,989 Patentee: Yamamoto et al. Issued: Nov. 19, 1991

U.S. Pat. No. 5,079,115 Patentee: Takashima Issued: Jul. 7, 1992

U.S. Pat. No. 4,403,848 and U.S. Pat. No. 4,833,503 disclose a multicolor electrophotographic printing machine in which a color separation latent image is formed on a photoconductive belt and developed with the appropriately colored toner particles. Thereafter, successive color separated latent images are formed and developed in superimposed registration with one another. In this way, a composite multicolor developed image is formed on the photoconductive belt and subsequently transferred to a sheet. The composite image on the sheet is then fused thereto.

U.S. Pat. No. 4,599,285, U.S. Pat. No. 4,679,929, U.S. Pat. No. 4,791,455, U.S. Pat. No. 4,809,038, U.S. Pat. No. 4,927,724, U.S. Pat. No. 4,941,003, U.S. Pat. No. 4,949,125, U.S. Pat. No. 5,023,632, U.S. Pat. No. 5,066,989 and U.S. Pat. No. 5,079,115 disclose various methods of forming color copies wherein the photoconductive member is charged and exposed to form an electrostatic latent image corresponding to a first color therein. This latent image is then developed with toner particles of a first color. The foregoing occurs during a first cycle and is repeated for the next several cycles to superimpose a plurality of different color toner images on the photoconductive member. After the composite multicolor image has been formed on the photoconductive member, the composite image is transferred to a copy sheet.

In accordance with one aspect of the present invention, there is provided a color electrophotographic printing machine including a photoconductive member. Means are provided for recording latent images having a resolution of at least 1.44 million pixels per square inch on the photoconductive member for each of a plurality of different colors. A plurality of developer units develop the latent images recorded on the photoconductive member with different color toner particles to form a toner image for each of the latent images resulting in a composite color image. The composite color image is transferred from the photoconductive member to a receiving member.

Pursuant to another aspect of the present invention, there is provided a method of color electrophotographic printing including recording latent images having a resolution of at least 1.44 million pixels per square inch on a photoconductive member for each of a plurality of different colors. The latent images recorded on the photoconductive member are developed with different color toner particles to form a toner image for each of the plurality of different latent images resulting in a composite color image. The composite color image is transferred from the photoconductive member to a receiving member.

Figure 2:
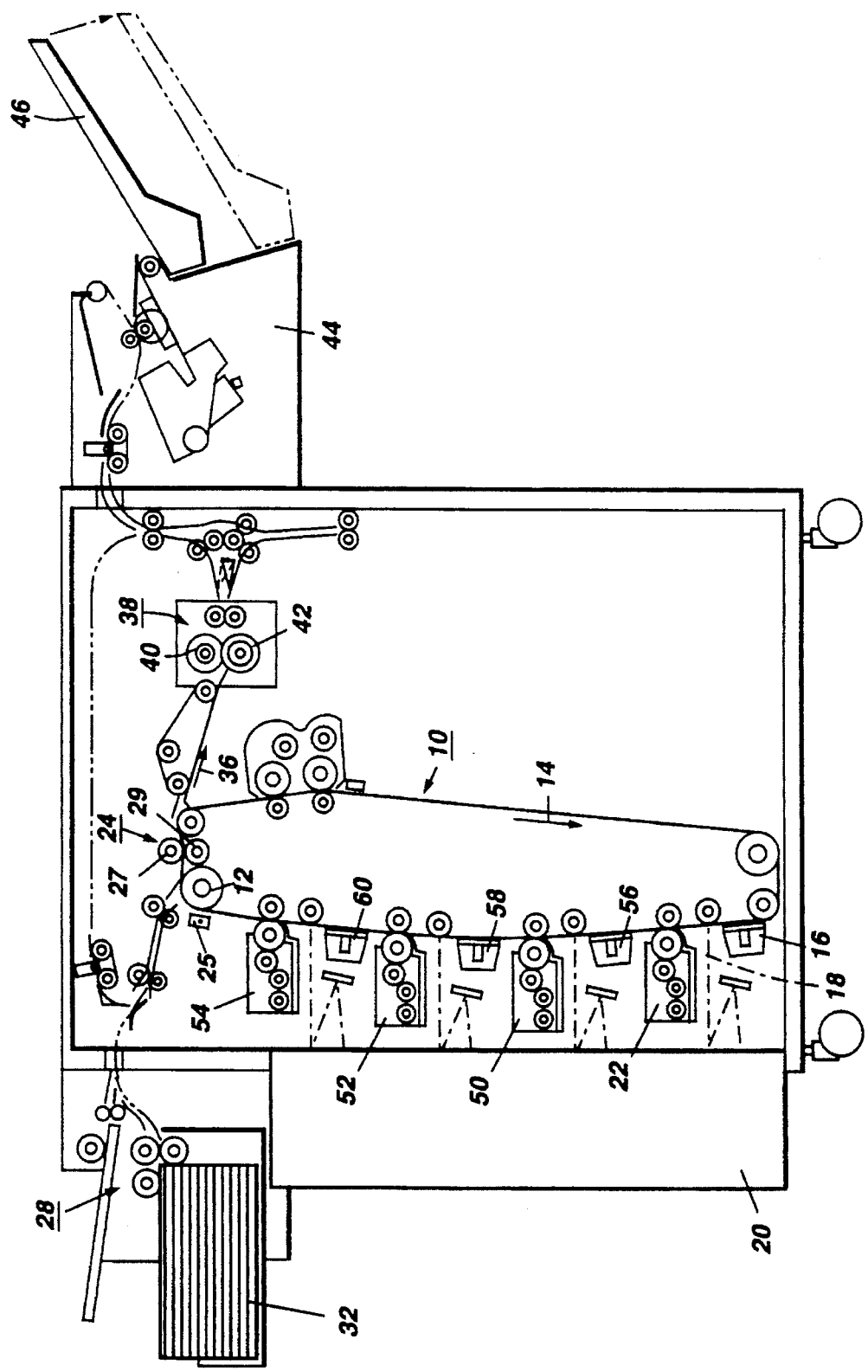

Other aspects of the present invention will become apparent as the following description proceeds and upon reference to the drawings, in which:

FIG. 1 is a schematic elevational view showing a multipass, multicolor printing machine; and FIG. 2 is a schematic elevational view showing a single pass, multicolor printing machine.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

For a general understanding of the the features of the present invention, reference is made to the drawings. In the drawings, like reference numerals have been used throughout to designate identical elements.

Referring initial to FIG. 1, there is shown a multipass, multicolor printing machine. As shown thereat, photoconductive belt 10 is entrained about a plurality of rollers 12. One of the rollers is coupled to a suitable motor (not shown) so as to be rotatably driven thereby. In this way, photoconductive belt 10 advances in the direction of arrow 14.

Initially, belt 10 passes through a charging station. At the charging station, a corona generating device 16 charges the photoconductive surface of belt 10 to a relatively high, substantially uniform potential. Preferably, corona generating device 16 includes a shield with a coronode wire disposed internally thereof. A grid is interposed between the coronode wire and the photoconductive belt. In this way, precise control of the charging is maintained. This insures adequate uniformity with low defects and few charge deficient spots. A suitable corona generating device 16 of the type heretofore described is typically known as Scorotron.

After the photoconductive surface of belt 10 is charged, the charged portion thereof is advanced to an exposure station. At the exposure station, an imaging beam 18 generated by a rastor output scanner (ROS) 20 exposes the charged portion of the photoconductive surface to record a color separated electrostatic latent image thereon. By way of example, an 800 spot per inch dual beam, 780 nanometer, ROS having 800×3200 spot per inch addressability is used. This insures adequate resolution and image density. A system of this type provides 2.56 million pixels per square inch. Alternatively, adequate information density may be achieved by using a ROS having a 600×2400 spot per inch addressability to provide 1.44 million pixels per square inch. The simple matrix of pixels per square inch, however, does not fully describe the microscopics of the pixel exposure and resultant effects on highlight and shadow dots. The characteristics of the photoconductive belt 10 must also be precisely controlled. Preferably, an organic photoconductive belt with infrared sensitivity of the type used in the Xerox Model No. 5665 printer is employed. Of course, one skilled in the art will appreciate that other types of photoconductive belts maybe used in lieu thereof provided that they have requisite characteristics. By using a combination of precise charge control, high image addressability and a high quality photoconductive member, a latent image having adequate uniformity with low defects and few charge deficient spots is achieved.

Next, the color separated electrostatic latent image is developed by developer unit 22. Developer unit 22 develops the electrostatic latent image recorded on photoconductive belt 10 with black toner particles. When particles having a volume average diameter of 7 microns are used, the density of the image developed is about 0.32 milligrams per centimeter$^2$ with a range given by the experimental error of measurement. Alternatively, in order to minimize sheet curl, toner particles having a volume average diameter of 4 microns are used. Under these circumstances, the developed image density is about 0.35 milligrams per centimeter$^2$. Preferably, a developer unit of the type known as a hybrid scavengeless developer unit is used. A developer unit of this type uses a pair of electrode wires closely spaced to a donor roll in the gap between the donor roll and the photoconductive member. An AC voltage is applied to the electrode wires to detach toner from the donor roll and form a toner powder cloud in the gap. Toner from the toner powder cloud is attracted to and develops the latent image recorded on the photoconductive member. A magnetic roll transports carrier having toner particles adhering triboelectrically thereto to a loading zone adjacent the donor roll. At the loading zone, toner particles are attracted from the carrier granules to the donor roll. A development system of this type is described in U.S. Pat. No. 4,868,600 issued Hays et al. on Sep. 19, 1989, the relevant portions thereof being hereby being incorporated into the present application.

After the black toner image has been developed on the photoconductive surface of belt 10, belt 10 continues to advance in the direction of arrow 14. The developed image on belt 10 passes the transfer station 24 and cleaning station 48. Both of these stations are non-operative, i.e. the cleaning brushes are spaced from the photoconductive belt. Thereafter, the developed image returns to the charging station 16 where the photoconductive belt having the first developed image thereon is recharged to a relatively high, substantially uniform potential. Subsequently, a different imaging beam 18 from ROS 20 selectively dissipates the charge to record another partial electrostatic latent image on the photoconductive surface of belt 10 corresponding to regions to be developed with yellow toner particles. This partial electrostatic latent image is now advanced to the next successive developer unit 50 which deposits yellow toner particles thereon. The yellow toner particles, may have a volume average diameter ranging from about 4 microns to about 7 microns. The 4 micron diameter toner particles have an average density of about 0.35 milligrams per centimeter square with the 7 micron diameter particles having a density of about 0.32 milligrams per centimeter square. The percent pigment by weight is dependent upon the selected pigment.

After the electrostatic latent image has been developed with the yellow toner, belt 10 continues to advance in the direction of arrow 14 through transfer station 24 and cleaning station 48, both of which are non-operative, to charging station 16. At charging station 16, the corona generating device charges the photoconductive surface of belt 10 to a relatively high, substantially uniform potential. Thereafter, another imaging beam 18 from ROS 20 selectively discharges the charge on the photoconductive surface to record a partial electrostatic latent image for development with magenta toner particles. The magenta toner particles may also range from about 4 microns to about 7 microns in diameter. The 4 micron diameter particles have an average density of about 0.35 milligrams per centimeter squared with the 7 micron diameter particles having a density of about 0.32 milligrams per centimeter square. The percent pigment by weight is dependent upon the selected pigment. The magenta developer unit deposits magenta toner particles in registration with the yellow and black toner particles previously formed on the photoconductive belt to form a magenta toner particle image in superimposed registration thereof. After the magenta toner has been formed on the photoconductive surface of belt 10, belt 10 advances in the direction of arrow 14 through transfer station 24 and cleaning station 48 to charging station 16. At this time, both the transfer station 24 and cleaning station 48 are non-operative.

At charging station 16, a corona generating device recharges the photoconductive surface to a relatively high, substantially uniform potential. Thereafter, another imaging beam 18 from ROS 20 selectively discharges those potions of the charge photoconductive surface which are to be developed with cyan toner. The latent image to be developed with cyan toner is advanced to cyan developer unit 54. The percent pigment by weight is dependent upon the selected pigment. The cyan toner particles may have a volume average diameter ranging from about 4 microns to about 7 microns.

When 4 micron diameter toner is used, the average density is about 0.35 milligrams per centimeter squared, i.e. toner mass per unit area. Alternatively, when 7 micron diameter toner particles are used, the average density is about 0.32 milligrams per centimeter squared.

While the average density of the toner particles ranges from about 0.32 milligrams per centimeter squared, one skilled in the art will appreciate that with standard pigment loading the density of the toner particles may range from about 0.5 milligrams per centimeter squared to about 0.7 milligrams per centimeter squared.

Developer units 50, 52 and 54 are all preferably hybrid scavengeless developer units.

At the cyan developer unit, cyan toner particles are deposited on the latent image to produce a cyan toner powder image. The cyan toner powder image is superimposed, at least partially, on those toner powder images previously developed on the photoconductive surface of belt 10. After the cyan toner powder image is developed on the photoconductive surface of belt 10, belt 10 advances the composite toner powder image toward transfer station 24.

Prior to the composite toner powder image reaching transfer station 24, a preconditioning corona generating device 25 applies a voltage to level the voltage thereon. Preferably, corona generating device 25 is a Scorotron with a DC bias applied thereon. In this way, voltage leveling of the toner is achieved.

At the transfer station, a sheet of support material, i.e. paper, is advanced from a stack 26 by sheet feeder 28. The sheet advances and is guided to the transfer station. Transfer station 24 includes a pair of rollers 27 and 29 where roller 27 is cammed into position before the sheet advances to the transfer station. The photoconductive belt and the sheet pass through the nip defined by rollers 27 and 29. Roller 27 is electrically biased to attract the composite toner powder image from the photoconductive surface of belt 10 to the sheet. A vacuum transport moves the sheet in the direction of arrow 36 to fusing station 38.

While transferring the composite multicolor image to a sheet has been described, one skilled in the art will appreciate the composite multicolor image may be transferred to an intermediate member, such as belt or drum, and then, subsequently, transferred to the sheet and fused thereto.

Fusing station 38 includes a heated fuser roller 40 and a backup roller 42. Preferably, fuser roller 40 is a resilient roller made from an elastomeric material such as a Silicone core with a Viton layer thereon. In the fusing operation, the toner particles coalesce with one another and bond to the sheet in image configuration forming a multicolor image thereon. After fusing, the finished sheet is discharged to finishing station 44. At finishing station 44, a plurality of sheets are bound together either by stapling and/or applying an adhesive thereto to form a set of sheets. This set of sheets is then advanced to catch tray 46 for subsequent removal therefrom by the machine operator. A multiplicity of finishing devices, such as sorters, staplers, etc., may be attached to the printing machine.

After the transfer of the multicolor toner image from the photoconductive surface of belt 10 to the sheet, the cleaning brushes of cleaning station 48 are brought into contact with the photoconductive surface. In this way, residual particles adhering to the photoconductive surface of belt 10 are cleaned therefrom.

Referring now to FIG. 2, there is shown a single pass multicolor printing machine. This printing machine employs a photoconductive belt 10 supported by a plurality of rollers or bars 12. Belt 10 advances in the direction of arrow 14 to move successive portions of the photoconductive surface sequentially beneath the various processing stations disposed about the path of movement thereof.

Initially, belt 10 passes through charging station 16. At the charging station, a corona generating device charges the photoconductive surface of belt 10 to a relatively high, substantially uniform potential. As previously noted, with reference FIG. 1, corona generating device 16 is a Scorotron.

After the photoconductive surface of belt 10 is charged, the charged portion thereof is advanced to an exposure station. At the exposure station, an imaging beam 18 generated by ROS 20 creates a color separated electrostatic latent image on the photoconductive surface of belt 10. ROS 20 is the same type of ROS as was described with reference to FIG. 1. This color separated electrostatic latent image is developed by developer unit 22.

Developer unit 22 deposits black toner particles on the electrostatic latent image. In this way, a black toner powder image is formed on the photoconductive surface of belt 10. As described with reference to FIG. 1, developer unit 22 is preferably a hybrid scavengeless developer unit. The black toner particles are of the same type as was described with reference to FIG. 1.

After the black toner image has been developed on the photoconductive surface of belt 10, belt 10 continues to advance in the direction of arrow 14 to a recharge station where a corona generating device 56 recharges the photoconductive surface to a relatively high, substantially uniform potential. Corona generating device 56 is also a Scorotron. Thereafter, a different imaging beam 18 from ROS 20 selectively dissipates the charge to record another partial electrostatic latent image on the photoconductive surface of belt 10 corresponding to the regions to be developed with yellow toner particles. These yellow toner particles are of the same type as was described with reference to FIG. 1. This partial electrostatic latent image is now advanced to the next successive developer unit 50.

Developer 50 deposits yellow toner particles on the photoconductive surface of belt 10 to form a yellow toner particle image thereon.

After the electrostatic latent image has been developed with the yellow toner particles, belt 10 advances in the direction of arrow 14 to the next recharge station. At this recharge station, a corona generating device 58 charges the photoconductive surface of belt 10 to a relatively high, substantially uniform potential. Once again, corona generating device 58 is preferably a Scorotron. Thereafter, another imaging beam 18 from ROS 20 selectively discharges the charge on the photoconductive surface to record a partial electrostatic latent image for development with magenta toner particles. After the latent image is recorded on the photoconductive surface, belt 10 advances the latent image to the magenta developer unit 52.

Magenta developer unit 52 deposits magenta toner particles on the latent image. The magenta toner particles are of the same type hereinbefore described with reference to FIG. 1. These toner particles may be partially in superimposed registration with a previously formed yellow powder image. After the magenta toner powder image is formed on the photoconductive surface of belt 10, belt 10 advances to the next recharge station.

At the next recharge station, corona generator 60 recharges the photoconductive surface of belt 10 to a relatively high, substantially uniform potential. Thereafter, another imaging beam 18 from ROS 20 selectively discharges those portions of the charged photoconductive surface which are to be developed with cyan toner particles. The latent image to be developed with cyan toner particles is advanced to the cyan developer unit 54.

At cyan developer unit 54, cyan toner particles are deposited on the photoconductive surface of belt 10. The cyan toner particles are of the same type previously described with reference to FIG. 1. These cyan toner particles form a cyan toner powder image which may be partially or totally in superimposed registration with the previously formed yellow and magenta toner powder images. In this way, a multicolor toner powder image is formed on the photoconductive surface of belt 10.

Developer units 50, 52 and 54 are also preferably hybrid scavengeless developer units of the type hereinbefore described with reference to FIG. 1.

Thereafter, belt 10 advances the multicolor toner powder image toward transfer station 24. Prior to transfer station 24, the multicolor toner powder image is formed on the photoconductive surface of belt 10.

Thereafter, belt 10 advances the multicolor toner powder image toward transfer station 24. Prior to transfer station 24, the multicolor toner powder image passes adjacent to corona generator 25. Preferably, corona generator 25 is a Scorotron. This corona generating device preconditions the multicolor toner powder image prior to transfer to level the voltage thereon. Scorotron 25 is electrically biased by a DC voltage source. In this way, voltage leveling of the toner is achieved. At transfer station 24, a sheet of support material, i.e. paper, is advanced from stack 32 by sheet feeders 28 and guided to transfer station 24. At transfer station 24, transfer rollers 27 and 29 transfer the composite multicolor toner powder image from the photoconductive surface of belt 10 to the sheet of support material. Rollers 27 and 29 are of the same type previously described with reference to FIG. 1. Once again, roller 27 is electrically biased to attract the toner powder image from the photoconductive surface of belt 10 to the sheet of support material. A vacuum transport 34 moves the sheet of support material in the direction of arrow 36 through fusing station 38.

Fusing station 38 includes a heated fusing roller 40 and a backup roller 42. Fuser roller 40 and backup roller 42 are of the same type previously described with reference to FIG. 1. The backup roller is resiliently urged into engagement with the fuser roller to form a nip through which the sheet of support material passes. In the fusing operation, the toner particles coalesce with one another and bond to the sheet in image configuration forming a multicolor image thereon. After fusing, the finished sheet is discharged to a finishing station 44 where the sheets are compiled and formed into sets which may be bound to one another. These sets are then advanced to a catch tray 46 subsequent to removal therefrom by the printing machine operator.

One skilled in art will appreciate that while the multicolor developed image has been disclosed as being transferred to a sheet of support material, it may be transferred to an intermediate member such as a belt or drum, and then subsequently transferred and fused to the sheet of support material.

Invariably, after the multicolor toner powder image has been transferred to the sheet of support material, residual toner particles remain adhering to the photoconductive surface of belt 10. These residual toner particles are removed therefrom by cleaning station 48. Cleaning station 48 is of the same type previously described with reference to FIG. 1.

It is clear that the improved color electrophotographic printing machine of the present invention uses a toner which enables reduced toner pile height for a given toner size. This significantly reduces sheet curl. Toner spread during fusing is achieved to produce adequate density and color gamut. High resolution, low noise subsystem performance in imaging, development, transfer and fusing are achieved to attain high quality. Fine toner particles of about 4 microns in diameter may be used in lieu of toner particles having 7 microns in diameter. These configurations reduce toner powder height and reduces sheet curl. High resolution is achieved during exposure. Through the interaction of the various subsystems within the printing machine low defects and high image quality are achieved. Prints from a color printing machine of the type described hereinbefore achieves lithographic quality.

It is, therefore, apparent that there has been provided in accordance with the present invention, a high quality color electrophotographic printing machine which fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all alternatives, modification and variations that fall within the spirit and broad scope of the appended claims.

We claim:

1. A color electrophotographic printing machine, including:

a photoconductive member;

means for recording latent images having a resolution of at least 1.44 million pixels per square inch on said photoconductive member for each of a plurality of different colors;

a plurality of developer units for developing the latent images recorded on said photoconductive member with the different color toner particles to form a different color toner image for each of the latent image resulting in a composite color image, at least one of said plurality of developer units using toner particles having a volume average diameter ranging from about 4 microns to about 7 microns and with the toner particles having an average diameter of about 4 microns forming an image having a density of about 0.32 milligrams per centimeter squared with the toner particles of about 7 microns forming an image having a density of about 0.3 milligrams per centimeter squared;

a receiving member; and means for transferring the composite color image from said photoconductive member to said receiving member.

2. A printing machine according to claim 1, wherein said plurality of developer units form a black toner image, a yellow toner image, a magenta toner image and a cyan toner image.

3. A printing machine according to claim 2, wherein said plurality of developer units comprises:

a black developer unit having a supply of black toner particles, a yellow developer unit having a supply of yellow toner particles, a magenta developer unit having a supply of magenta toner particles, and a cyan developer unit having a supply of cyan toner particles.

4. A printing machine according to claim 1, wherein said transferring means includes:

a pair rollers forming a nip therebetween with said receiving member moving through the nip and one of said rollers being electrically biased to transfer the composite color image from said photoconductive member to said receiving member; and a corona generating device for applying a leveling voltage on the composite color image on said photoconductive member before said receiving member enters into the nip.

5. A printing machine according to claim 1, further including means for fusing the composite color image on said receiving member.

6. A printing machine according to claim 5, wherein said fusing means includes:

a heated fuser roll; and a backup roll in contact with said fuser roll to form a nip therebetween with said receiving member moving through the nip during fusing of the composite color image thereon.

7. A printing machine according to claim 1, wherein said receiving member includes a final sheet of support material.

8. A printing machine according to claim 1, wherein said receiving member includes an intermediate member.

9. A printing machine according to claim 8, further including:

a final sheet of support material; and means for transferring the composite color image from said intermediate member to said final sheet of support material.

10. A method of color electrophotographic printing, including:

recording latent images having a resolution of at least 1.44 million pixels per square inch on a photoconductive member for each of a plurality of different colors;

developing the latent images recorded on the photoconductive member with different color toner particles having a volume average diameter arranging from about 4 microns to about 7 microns to form a toner image having a density of about 0.32 milligrams per centimeter squared for toner particles having a volume average diameter of about 4 microns and a density of about 0.35 milligrams per centimeter squared for toner particles having a volume average diameter of about 7 microns for each of the plurality of the latent images resulting in a composite color image; and transferring the composite color image from the photoconductive member to a receiving member.

11. A method according to claim 10, wherein said developing step includes forming a black toner image, a yellow toner image, a magenta toner image and a cyan toner image.

12. A method according to claim 11, wherein said developing step includes using black toner particles, yellow toner particles, magenta toner particles and cyan toner particles.

13. A method according to claim 10, wherein said developing step includes using toner particles having a density ranging from about 0.5 milligrams per centimeter squared to about 0.7 milligrams per centimeter squared.

14. A method according to claim 10, wherein said transferring step includes:

moving the receiving member through the nip formed by a pair of rollers;

electrically biasing at least one of the pair of rollers to transfer the composite color image from the photoconductive member to the receiving member; and applying a leveling voltage on the composite color image on the photoconductive member before the receiving member enters into the nip.

15. A method according to claim 10, further including fusing the composite color image on the receiving member.

16. A method according to claim 15, wherein said fusing step includes moving the receiving member through a nip formed by a heated fuser roll contacting a backup roll to fuse the composite color image on the receiving member.

17. A method according to claim 10, further including:

transferring the composite color image from the receiving member to a sheet of final support material; and fusing the composite color image on the sheet of final support material.

* * * * *